United States Patent
Fujisawa et al.

(10) Patent No.: US 8,664,141 B2
(45) Date of Patent: Mar. 4, 2014

(54) CATALYST FOR CLEANING UP NITROGEN OXIDES AND A METHOD FOR PRODUCING SAME

(75) Inventors: Masatoshi Fujisawa, Kure (JP); Yasuyoshi Kato, Kure (JP)

(73) Assignee: Babcock-Hitachi Kabushiki Kaisha, Tokyo (JP)

( * ) Notice: Subject to any disclaimer, the term of this patent is extended or adjusted under 35 U.S.C. 154(b) by 49 days.

(21) Appl. No.: 13/056,142

(22) PCT Filed: Jul. 29, 2009

(86) PCT No.: PCT/JP2009/063466
§ 371 (c)(1),
(2), (4) Date: Apr. 15, 2011

(87) PCT Pub. No.: WO2010/013730
PCT Pub. Date: Apr. 2, 2010

(65) Prior Publication Data
US 2011/0183839 A1   Jul. 28, 2011

(30) Foreign Application Priority Data
Jul. 29, 2008 (JP) ................................ 2008-194427

(51) Int. Cl.
C08F 4/60 (2006.01)
B01J 21/00 (2006.01)
B01J 27/055 (2006.01)
B01D 53/56 (2006.01)
C01B 21/072 (2006.01)
C01B 17/96 (2006.01)

(52) U.S. Cl.
USPC ........ 502/132; 502/100; 502/218; 423/242.4; 423/412; 423/544

(58) Field of Classification Search
None
See application file for complete search history.

(56) References Cited

U.S. PATENT DOCUMENTS

| 5,430,000 A * | 7/1995 | Timken .................... 502/60 |
| 2005/0107250 A1 * | 5/2005 | Addiego et al. ............. 502/263 |
| 2005/0135980 A1 * | 6/2005 | Park et al. ................ 423/239.1 |

FOREIGN PATENT DOCUMENTS

| JP | 06-198131 | 7/1994 |
| JP | 8-089813 | 4/1996 |
| JP | 9-299800 | 11/1997 |
| JP | 11033402 | * 2/1999 |
| JP | 11-319566 | 11/1999 |
| JP | 2000 15099 | 1/2000 |
| JP | 2004-330191 | 11/2004 |

OTHER PUBLICATIONS

Masuda, K. et al. "Silver Promoted Catalyst for Removal of Nitroegn oxides from Emission of Diesel Engines". Applied Catalysis B: Enviornmental 8, 33-40 (1996).*
International Search Report mailed Nov. 2, 2009 for International application No. PCT/JP2009/063466.
Meunier, F.C. et al., "*Effect of ex situ treatments with $SO_2$ on the activity of a low loading silver-alumina catalyst for the selective reduction of NO and $NO_2$ by propene*", Elsevier, Applied Catalysis B: Environmental 24 (2000), pp. 23-32.
Miyadera, Tatsuo, "*Selective reduction of nitric oxide with ethanol over an alumina-supported silver catalyst*", Elsevier, Applied Catalysis B: Environmental 13 (1997), pp. 157-165.

* cited by examiner

*Primary Examiner* — Melvin C Mayes
*Assistant Examiner* — Sheng H Davis
(74) *Attorney, Agent, or Firm* — Fay Sharpe LLP

(57) ABSTRACT

Provided is a silver-supported alumina catalyst for reducing nitrogen oxides using ethanol, which has the drawbacks of the conventional silver-supported alumina catalysts improved, has high performance, is not likely to deteriorate over time, and has excellent initial performance and durability.
A catalyst for purifying nitrogen oxides, which purifies nitrogen oxides in exhaust gas using an alcohol as a reducing agent, and contains alumina, aluminum sulfate and silver as main components.

12 Claims, No Drawings

CATALYST FOR CLEANING UP NITROGEN OXIDES AND A METHOD FOR PRODUCING SAME

TECHNICAL FIELD

The present invention relates to a catalyst for purifying nitrogen oxides in exhaust gas, and more particularly, to a catalyst for purifying nitrogen oxides in exhaust gas using an alcohol as a reducing agent, and a method for producing the catalyst.

BACKGROUND ART

As a technology for removing nitrogen oxides in exhaust gases from boilers and the like, a system of bringing the exhaust gas into contact with a catalyst to react using ammonia as a reducing agent, and thereby decomposing nitrogen oxides into harmless nitrogen and steam, now constitutes the mainstream at present. However, since ammonia used as a reducing agent is a toxic substance, handling during transport or storage of ammonia is difficult, and since unreacted ammonia causes atmospheric pollution, there is a strong demand for the development of a NOx removal technology using a reducing agent other than ammonia. Thus, extensive research is being conducted about a large number of various reducing agents.

Among these, there has been disclosed a technology of purifying exhaust gas by means of a silver-supported alumina catalyst using ethanol as a reducing agent (Non-Patent Document 1). Furthermore, there have been proposed a catalyst in which silver and sulfuric acid, or silver sulfate is supported on an inorganic oxide such as alumina (Patent Document 1), or a catalyst having optimized contents of $SiO_2$, $Na_2O$ and chlorine in a silver-supported alumina catalyst (Patent Document 2).

Patent Document 1: Japanese Patent Application Laid-Open (JP-A) No. 6-198131
Patent Document 2: JP-A No. 2000-15099
Non-Patent Document 1: Applied Catalysis B: Environmental 13 (1997), p. 157-165

DISCLOSURE OF THE INVENTION

Problems to be Solved by the Invention

However, it cannot still be said that an improvement in the performance of the silver-supported alumina catalyst in the prior art has been achieved sufficiently, and also, in order to reduce the cost of catalysts using highly expensive silver, catalysts having higher performance are required. Furthermore, silver-supported alumina catalysts with added chlorine or impregnated with sulfuric acid, or alumina catalysts having silver sulfate supported thereon have a drawback that these catalysts are prone to deteriorate over time due to hydrolysis or high vapor pressure of impregnated sulfuric acid. That is, in the conventional silver-supported catalysts, those catalysts having silver chloride supported thereon have chlorine slowly eliminated during an exhaust gas treatment, and thereby the performance is decreased. Furthermore, even in the catalysts having silver sulfate supported thereon, when $SO_3$ is eliminated during the reaction, there is caused a decrease in the activity. On the other hand, in the method of having silver supported on an alumina support, and then impregnating the alumina support with sulfuric acid, since the sulfuric acid radicals penetrate into the inside of the bulk, the effect of converting silver at the catalyst surface into a salt form is reduced. Thus, the effect of conversion into a salt form can be increased by increasing the amount of impregnation of sulfuric acid; however, this time, a decrease in the specific surface area occurs as a result of sulfatization of the alumina support, thus causing a decrease in the performance. Furthermore, in these catalysts, the sulfatized alumina hydrolyzes in the co-presence of steam, and releases sulfuric acid having high vapor pressure, thus the performance being decreased over time.

An object of the present invention is to provide a silver-supported alumina catalyst for reducing nitrogen oxides using ethanol, which has the drawbacks of the conventional silver-supported alumina catalysts removed, has high performance, is not likely to deteriorate over time, and has excellent initial performance and durability.

Means for Solving the Problems

In order to achieve the object described above, the inventions in the present application are as follows.

(1) A catalyst for purifying nitrogen oxides in exhaust gas using an alcohol as a reducing agent, the catalyst comprising alumina, aluminum sulfate and silver as main components.

(2) The catalyst as described in item (1), wherein the catalyst contains 0.5% to 5% by weight of silver and 0.5% to 10% by weight of aluminum sulfate based on alumina.

(3) A method for producing the catalyst of item (1) or (2), the method comprising impregnating alumina with a silver salt solution, subsequently calcining the impregnated alumina to obtain a silver-supported alumina catalyst, and supporting aluminum sulfate on the silver-supported alumina catalyst.

The inventors of the present invention conducted a thorough investigation to improve the performance of silver-supported alumina catalysts, which are catalysts for reducing nitrogen oxides by means of ethanol, and as a result, they obtained a conclusion that it is effective for enhancing the catalyst performance to have silver, which is an active component, exist in a salt form. That is, the inventors found that in the reaction for reducing nitrogen oxides by means of ethanol, when the active component of the catalyst is metallic silver or silver oxide, the reaction rate is slow, but when the active component is supported in the form of a silver salt compound such as silver chloride or silver sulfate, the reaction rate is significantly increased.

In regard to the catalyst of the present invention, as aluminum sulfate which is a very stable compound is deposited adjacently to an active site of the catalyst, silver can be brought close to a salt form. Therefore, even if the reaction proceeds at the active site, the catalyst can be made to be almost unaffected by the reaction. For this reason, it is effective to adopt a method of supporting silver on alumina and then supporting aluminum sulfate on the surface by an impregnation method or the like, but the same effects can be expected even with a method of supporting silver after sulfatizing a part of the alumina surface.

In regard to the catalyst composition of the present invention, when 0.5% to 5% by weight of silver and 0.5% to 10% by weight of aluminum sulfate based on alumina are incorporated, high performance can be obtained. However, more satisfactory results are obtained when preferably 1% to 2% by weight of silver and 1% to 4% by weight of aluminum sulfate are incorporated.

It is preferable to carry out the production of the catalyst by using a method of impregnating alumina with a silver salt solution, subsequently calcining the impregnated alumina to obtain a silver-supported alumina catalyst, impregnating the alumina catalyst with aluminum sulfate, and then calcining the impregnated catalyst, but the silver-supported alumina catalyst and aluminum sulfate may also be used in mixture. Furthermore, a method of sulfatizing a portion of alumina, and then supporting silver as an active component, may also be used.

As the alumina support to be used in the present invention, γ-alumina or boehmite, which both have large specific surface areas, are suitable, and particularly, satisfactory results are obtained with boehmite. In this case, when the support amount of silver relative to the alumina support is adjusted to 0.5% to 5% by weight, a catalyst with high activity is obtained. When the support amount is less than 0.5% by weight, there are too few active sites, and therefore high activity cannot be obtained. Furthermore, when the support amount is more than 5% by weight, an effect of enhancing the activity by sintering or the like is not obtained. As a result, a catalyst having high activity can be obtained even with a small support amount of silver, and this leads to a reduction in the catalyst cost. Furthermore, when the amount of aluminum sulfate relative to silver is less than 1 in terms of weight ratio, the amount is not sufficient for bringing silver into a salt form, and when the amount of aluminum sulfate is more than 2, the performance of the catalyst is lowered because of a decrease in the specific surface area of the support. Therefore, high effects can be obtained by adjusting the amount of aluminum sulfate to 0.5% to 10% by weight.

Effects of the Invention

According to the present invention, nitrogen oxides in exhaust gas can be efficiently decomposed by using ethanol as a reducing agent, and since there is no decrease in the catalyst performance, it is made possible to operate the catalyst for a long time without exchanging the catalyst.

BEST MODES FOR CARRYING OUT THE INVENTION

Hereinafter, the present invention will be described in detail by way of specific examples.

EXAMPLE 1

As an alumina support, boehmite (trade mark: PURAROX Sba-200, manufactured by Condea Chemie GmbH) was impregnated with a 3 wt % (in terms of Ag) aqueous solution of silver nitrate, and the boehmite was evaporated and dried to solid in a sand bath. Subsequently, the resultant was calcined at 500° C. for 2 hours, and thus a comparative sample 1 (silver-supported alumina catalyst) was obtained. An aqueous solution obtained by dissolving aluminum sulfate was supported by impregnation at a concentration of 6% by weight based on $Al_2O_3$ contained in the comparative sample 1, and then the comparative sample 1 was calcined again at 500° C. for 2 hours to obtain sample 1. The Sample 1 was molded by a hydraulic press and then granulated into 10 to 20 meshes. An apparatus packed with the particulate catalyst thus obtained in a reaction vessel was used to carry out the removal of nitrogen oxides in a gas under the gas conditions indicated in Table 3, and the removal ratio was measured.

COMPARATIVE EXAMPLE 1

A particulate catalyst obtained by directly molding and granulating the comparative sample 1 obtained in Example 1 was used, and the removal of nitrogen oxides was carried out under the gas conditions indicated in Table 3 and in the same manner as Example 1. The removal ratio was measured.

EXAMPLE 2

The same test as in Example 1 was carried out except that the support amount of silver used in Example 1 was changed to 0.5% by weight, and the support amount of aluminum sulfate was changed to 0.5% by weight. The removal ratio of nitrogen oxides was measured.

EXAMPLE 3

The same test as in Example 1 was carried out except that the support amount of silver used in Example 1 was changed to 5% by weight, and the support amount of aluminum sulfate was changed to 10% by weight. The removal ratio of nitrogen oxides was measured.

EXAMPLE 4

The same test as in Example 1 was carried out except that the support amount of silver used in Example 1 was changed to 0.3% by weight, and the support amount of aluminum sulfate was changed to 0.6% by weight. The removal ratio of nitrogen oxides was measured.

EXAMPLE 5

The same test as in Example 1 was carried out except that the support amount of silver used in Example 1 was changed to 10% by weight, and the support amount of aluminum sulfate was changed to 20% by weight. The removal ratio of nitrogen oxides was measured.

EXAMPLE 6

After the performance of the removal of nitrogen oxides under the conditions of Example 1 was measured, the performance of the removal of nitrogen oxides obtained after performing a durability test for 10 hours under the gas conditions indicated in Table 3 was measured.

COMPARATIVE EXAMPLE 2

The comparative sample 1 obtained in Example 1 was impregnated with sulfuric acid at a concentration of 6% by weight based on $Al_2O_3$, and then the resultant was calcined again at 500° C. for 2 hours to obtain Comparative Sample 2. A particulate catalyst obtained by molding the comparative sample 2 by a hydraulic press and granulating into 10 to 20 meshes was used, and the removal ratio of nitrogen oxides under the gas conditions indicated in Table 3 was measured. Subsequently, the particulate catalyst was subjected to a durability test for 10 hours under the gas conditions indicated in Table 3, and thus the removal performance obtained after the durability test was measured.

COMPARATIVE EXAMPLE 3

The boehmite (trade mark: PURAROX Sba-200, manufactured by Condea Chemie GmbH) was impregnated with a 3 wt % (in terms of Ag) aqueous solution of silver nitrate, and hydrochloric acid was added thereto in an amount of 1.5-fold the molar amount of silver, to thereby deposit silver chloride. The resultant was evaporated and dried to solid in a sand bath, and then was calcined at 500° C. for 2 hours, and thus a comparative sample 4 was obtained. A particulate catalyst obtained by molding the comparative sample 4 by a hydraulic press and then granulating into 10 to 20 meshes was used, and the removal ratio of nitrogen oxides under the gas conditions indicated in Table 3 was measured. Subsequently, the particulate catalyst was subjected to a durability test for 10 hours under the gas conditions indicated in Table 3, and thus the removal performance obtained after the durability test was measured.

COMPARATIVE EXAMPLE 4

The boehmite (trade mark: PURAROX Sba-200, manufactured by Condea Chemie GmbH) was impregnated with a 3 wt % (in terms of Ag) aqueous solution of silver nitrate, and the impregnated boehmite was evaporated and dried to solid in a sand bath. Subsequently, the resultant was calcined at 500° C. for 2 hours, and thus a comparative sample 3 was obtained. A particulate catalyst obtained by molding the comparative sample 3 by a hydraulic press and then granulating into 10 to 20 meshes was used, and the removal ratio of nitrogen oxides under the gas conditions indicated in Table 2 was measured. Subsequently, the particulate catalyst was subjected to a durability test for 10 hours under the gas conditions indicated in Table 3, and thus the removal performance obtained after the durability test was measured.

The measurement results of Examples 1 to 5 and Comparative Example 1 are presented in Table 1. From a comparison between the Examples and the Comparative Examples, it is clearly shown that the catalysts having added aluminum sulfate exhibit high activity. In this case, it is understood from a comparison between Examples 1 to 3 and Examples 4 and 5, that a support amount of silver of 0.5% to 5% by weight, and an amount of addition of aluminum sulfate of 0.5% to 10% by weight are suitable.

Subsequently, the measurement results of Example 6 and Comparative Examples 2 to 4 are presented in Table 2. In the Comparative Examples, all of the catalysts underwent a decrease in activity, while in the Examples of the present invention, there was no decrease in activity, and it is obvious that the obtained catalysts have excellent durability.

TABLE 1

|  | Removal ratio of nitorogen oxides (%) |
|---|---|
| Example 1 | 73.8 |
| Example 2 | 75.0 |
| Example 3 | 71.3 |
| Example 4 | 64.1 |
| Example 5 | 68.6 |
| Comp. ex. 1 | 54.5 |

TABLE 2

|  | Removal ratio of nitorogen oxides (%) | |
|---|---|---|
|  | Initial Performance | After 10-hour durability test |
| Example 6 | 73.8 | 78.0 |
| Comp. ex. 2 | 68.4 | 64.9 |
| Comp. ex. 3 | 86.2 | 66.3 |
| Comp. ex. 4 | 70.7 | 67.1 |

TABLE 3

| Space-velocity | 120,000 h$^{-1}$ |
|---|---|
| Reaction temperature | 350° C. |
| O$_2$ | 6% |
| H$_2$O | 6% |
| NO | 200 ppm |
| C$_2$H$_5$OH | 400 ppm |
| N$_2$ | Balance |

The invention claimed is:

1. A catalyst for purifying nitrogen oxides in exhaust gas using an alcohol as a reducing agent, the catalyst comprising alumina, aluminum sulfate and silver as main components; wherein the catalyst contains 0.5% to 5% by weight of silver and 1% to 4% by weight of aluminum sulfate based on alumina.

2. The catalyst of claim 1, wherein the catalyst contains 1% to 2% by weight of silver.

3. The catalyst of claim 1, wherein the weight ratio of aluminum sulfate to silver is from 1 to 2.

4. The catalyst of claim 1, wherein the catalyst consists of alumina, aluminum sulfate, and silver.

5. The method for producing the catalyst according to claim 1, comprising impregnating alumina with a silver salt solution, subsequently calcining the impregnated alumina to obtain a silver-supported alumina catalyst, and supporting aluminum sulfate on the silver-supported alumina catalyst.

6. The method for producing the catalyst according to claim 5, wherein the catalyst contains 1% to 2% by weight of silver.

7. The method for producing the catalyst according to claim 5, wherein the weight ratio of aluminum sulfate to silver is from 1 to 2.

8. The method of claim 5, wherein the catalyst consists of alumina, aluminum sulfate, and silver.

9. The method for producing the catalyst according to claim 5, wherein the silver salt is an aqueous solution of silver nitrate, silver chloride, or silver sulfate.

10. The method for producing the catalyst according to claim 9, wherein the silver salt is an aqueous solution of silver nitrate.

11. The method for producing the catalyst according to claim 9, wherein the silver salt is an aqueous solution of silver chloride.

12. The method for producing the catalyst according to claim 9, wherein the silver salt is an aqueous solution of silver sulfate.

* * * * *

UNITED STATES PATENT AND TRADEMARK OFFICE
CERTIFICATE OF CORRECTION

PATENT NO. : 8,664,141 B2
APPLICATION NO. : 13/056142
DATED : March 4, 2014
INVENTOR(S) : Fujisawa et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 125 days.

Signed and Sealed this
Twenty-ninth Day of September, 2015

Michelle K. Lee
*Director of the United States Patent and Trademark Office*